Figure 7:
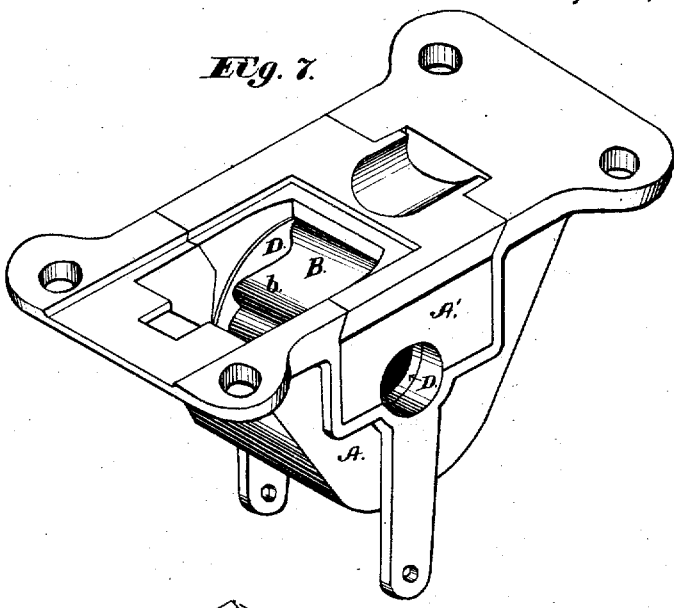

3 Sheets—Sheet 1.
B. REGAN, Dec'd,
P. H. GUNCKEL, Administrator, Assignor to W. H. NAUMAN, Assignor of one-half his right to J. W. STODDARD & Co.
Grain-Drill.
No. 8,819. Reissued July 22, 1879.
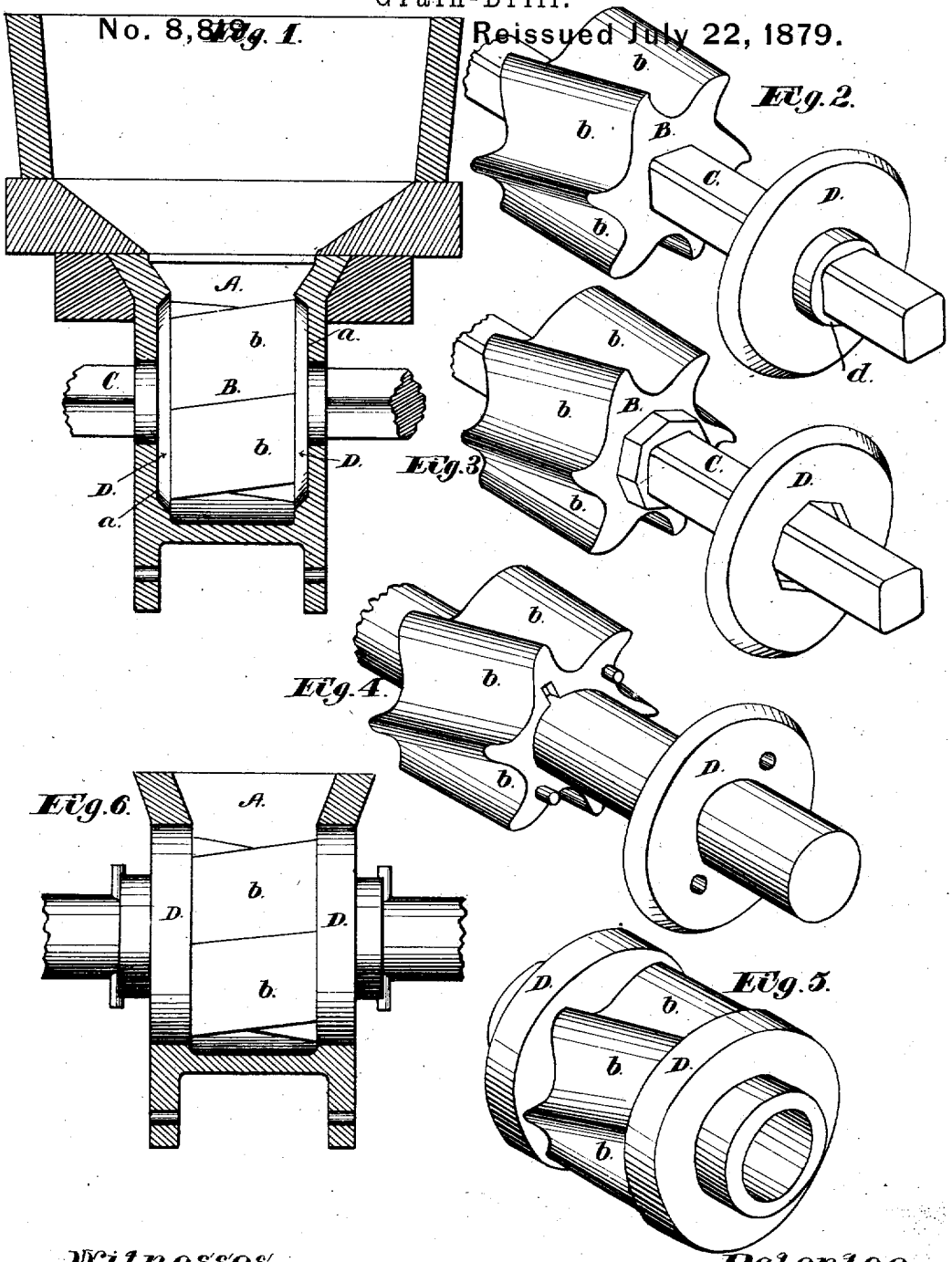
Witnesses;
Chas. M. Peck
A. F. Campbell
Patentee;
William H. Nauman
assignee of Bernard Regan
deceased,
by Peck & Ritchie
his attys.
N. PETERS, PHOTO-LITHOGRAPHER, WASHINGTON, D. C.

B. REGAN, Dec'd,

P. H. GUNCKEL, Administrator, Assignor to W. H. NAUMAN, Assignor of one-half his right to J. W. STODDARD & Co.

Grain-Drill.

No. 8,819. Reissued July 22, 1879.

Witnesses;
Chas. M. Peck
P. H. Paulfel

Patentee;
William H. Nauman
assignee of Bernard Regan
deceased
by Peck & Ritchie
his Attys.

N. PETERS, PHOTO-LITHOGRAPHER, WASHINGTON, D. C.

B. REGAN, Dec'd,

P. H. GUNCKEL, Administrator, Assignor to W. H. NAUMAN, Assignor of one-half his right to J. W. STODDARD & Co.

Grain-Drill.

No. 8,819. Reissued July 22, 1879.

Witnesses;
Chas. M. Beck
P. F. Pamphil

Patentee;
William H. Nauman
assignee of Bernard Regan, deceased,
by Beck & Ritchie
his Attys;

N. PETERS, PHOTO-LITHOGRAPHER, WASHINGTON, D. C.

UNITED STATES PATENT OFFICE.

WILLIAM H. NAUMAN, OF DAYTON, OHIO, ASSIGNEE, BY MESNE ASSIGNMENTS, OF PATRICK H. GUNCKEL, ADMINISTRATOR DE BONIS NON OF BERNARD REGAN, DECEASED, ASSIGNOR OF ONE-HALF HIS RIGHT TO JOHN W. STODDARD & CO., OF SAME PLACE.

IMPROVEMENT IN GRAIN-DRILLS.

Specification forming part of Letters Patent No. 46,821, dated March 14, 1865; Reissue No. 8,819, dated July 22, 1879; application filed June 30, 1879.

*To all whom it may concern:*

Be it known that BERNARD REGAN, late of Miamisburg, in the county of Montgomery and State of Ohio, did invent a new and useful Improvement in Grain-Drills; and I do hereby declare the following to be a full, clear, and exact description thereof, reference being had to the accompanying drawings, making part of this specification.

This improvement relates to that class of seed-delivering apparatus of grain-drills which contains a rotary feeder armed with teeth or blades, and working in a secondary hopper, seed box or cup; and the object of the invention is to prevent the cutting or crushing of kernels of grain between the feeder and the ends or the bottom of the seed-box, as well as, under certain conditions of construction, to prevent the escape of the grain from any other portion of the cup than the vent or discharging-orifice.

The novelty of this invention consists in recessing circular washers or disks in the end walls of secondary hoppers or seed-cups of the class above mentioned in such a manner that they shall be concentric with the feed-wheels, and shall form, in effect, revolving ends to said cups, and at the same time shall be substantially flush on their inner surfaces with the said inner walls, whereby crushing of the grain is prevented, and whereby, when these washers or disks are recessed in openings entirely through the end walls, the escape of the grain through said openings is prevented, all as will be herewith set forth, and specifically claimed.

Figure 8:
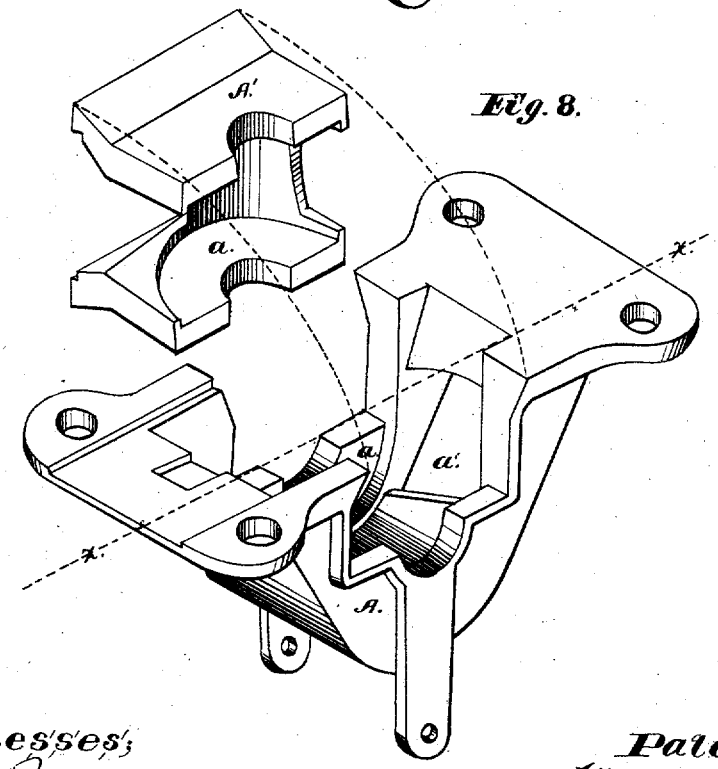
Figure 9:
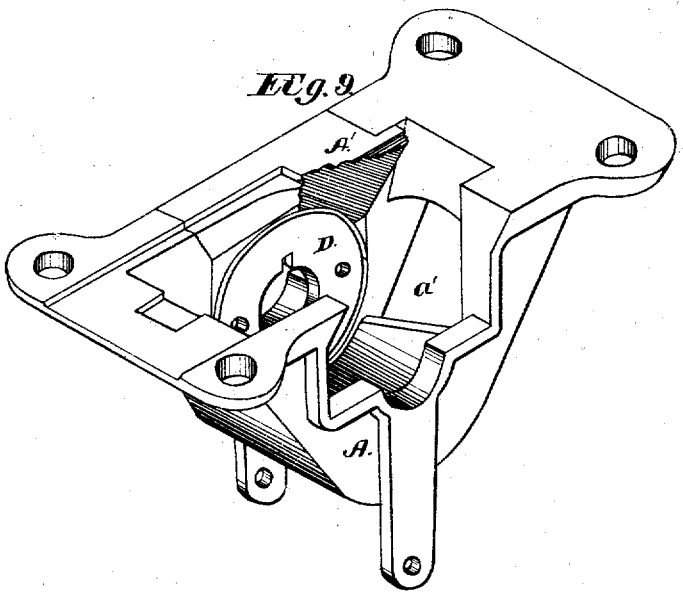
Figure 10:
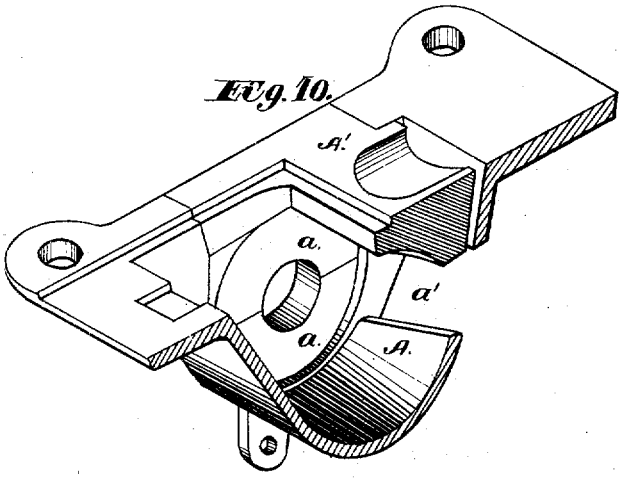

In the accompanying drawings, Figure 1, Sheet 1, is a sectional end elevation through the seed-delivering apparatus which embodies the improvement. Fig. 2, Sheet 1, represents the feeder and the disk or washer detached. Figs. 3, 4, and 5, Sheet 1, are perspective views, representing modifications in the construction of the improved device. Fig. 6, Sheet 1, is an axial section through the cup, which has the openings for the washers extending entirely through the end walls. Fig. 7, Sheet 2, is a perspective view of the secondary hopper or cup with the feeder and washer shown in position. Fig. 8, Sheet 2, shows the seed box or cup and saddle detached. Fig. 9, Sheet 3, shows the cup or seed-box and a portion of the saddle with a washer or disk in position. Fig. 10, Sheet 3, is a sectional perspective of the seed box or cup, taken at the line *x x* of Fig. 8.

A is the seed box or cup, also known as a "secondary hopper," converging toward a rounded bottom, so as to snugly inclose the ends and lower part of the periphery of a rotary feed-wheel or wallower, B, whose blades or teeth *b* serve to agitate the seed, and to discharge it through the ventage *d*.

The feed-wheel is mounted upon and revolves with a shaft, C, which may be a feathered cylinder, as in Fig. 4, or secured by a collar, as in Fig. 6, or it may have a square or other polygonal section, as in Figs. 1, 2, and 3, in which case it may consist of such rods of iron as may be found ready in the stores; nor need the shaft be in one piece, provided the ends meet inside of a feeder, which thus becomes a clutch-box or coupling.

In order to prevent the kernels being caught between the feed-wheel and the ends or bottom of the seed-box, by which so much grain is crushed and destroyed in seeding apparatus of this class, the inventor provides frusto-conoidal, cylindrical, or other smooth and circular disks, washers, or collars D, which disks or washers are made to revolve with the shaft and feeder, and occupy circular cavities or recesses *a* in the inner surface of the ends of the cups, the said cavities or recesses corresponding in depth with the thickness of the said washers, so as to bring the surfaces of the washers next the feed-wheels flush with the inner surfaces of the seed-cup ends.

The seed-cup may be formed in one piece, as represented in Fig. 1; but a preferable mode of construction is that represented in Figs. 7, 8, 9, and 10, A representing the cup, and A′ representing a saddle. When the form represented in Fig. 7 is employed, one half of the cavity or recess for the disk or collar is formed in the cup, and the other half in the saddle. A seed-cup thus constructed can at any time be detached from the hopper for inspection or repair without withdrawing the shaft C. The collars, disks, or washers being thus let in or recessed, so as to bring their flat surfaces flush with those of the cup and saddle, become in effect revolving ends to the seed-cup.

The form selected to illustrate this invention is preferred on account of its simplicity and effectiveness in actual use; but it is not desired to restrict the invention to the above, so long as the same results are attained by means substantially equivalent. For example, an octagonal or other prismatic boss upon the feeder may enter a corresponding aperture in the collar, (see Fig. 3,) or small studs or teats entering holes in the collar may, in like manner, secure its corotation with the feeder, as in Fig. 4; or the collars may be cast in one piece with the feeder, as in Fig. 5, and these collars may even come through to the outside of the box, as in Fig. 6.

The essential features of this improvement are, that the disks, collars, or washers shall be entirely circular—that is, free from notches or other indentations upon their peripheries—that they shall revolve with the feed-wheels, and that they shall be recessed or let into the end walls of the cups, so as to be substantially flush with the interior end surfaces of said cups.

It is to be noticed that when these disks or washers are recessed in openings extending entirely through the end walls of the cups they not only prevent the crushing of the grain, but they also prevent its escape through the said openings; and it will be further noticed that these washers form bearings for the wheels in the cups.

I am aware that cogged feed-wheels have been proposed having indented or scalloped washers which revolve between the feed-wheel and the box-side, but in such a manner that the peripheries of the washers have been exposed within the box or cup, and have been liable to catch and crush the kernels between the said peripheries and the cup-bottom, and I therefore make no claim to such; nor do I claim collars formed with notched or scalloped peripheries, so as to constitute a part of the feeding mechanism.

I am further aware that it is not new to employ a feed-wheel which has its bearing in the cup.

Having thus fully described the invention, what is claimed as new is—

1. In a feed for grain-drills employing cups or secondary hoppers and contained feed-wheels, disks, collars, or washers, of equal or greater diameter than the feed-wheels, revolving with said wheels, and recessed in the end walls of said cups, so as to be substantially flush on their inner surfaces with the interior end walls of said cups, as and for the purpose specified.

2. The combination, with a feed-wheel revolving in a cup or secondary hopper, of a disk or washer, of equal or greater diameter than the wheel, concentric with said wheel, revolving therewith, and recessed in the end wall of said cup, whereby crushing of the grain is prevented, and whereby when the recess for the washer extends through the said end wall the grain is prevented from escaping therethrough, as set forth.

3. The combination, with feed-wheels revolving in cups or secondary hoppers, of recessed concentric revolving washers, of equal or greater diameter than the said wheels, which washers form bearings for the said wheels in the cups, as set forth.

Witness my hand this 17th day of June, A. D. 1879.

WILLIAM H. NAUMAN.

Witnesses:

WM. C. THOMPSON,

CHAS. M. PECK.